US012587282B2

(12) United States Patent
Moon et al.

(10) Patent No.: US 12,587,282 B2
(45) Date of Patent: Mar. 24, 2026

(54) APPARATUS AND METHOD FOR MAINTAINING WAVELENGTH INTERVAL OF LIGHT SOURCES

(71) Applicant: ELECTRONICS AND TELECOMMUNICATIONS RESEARCH INSTITUTE, Daejeon (KR)

(72) Inventors: Sang Rok Moon, Daejeon (KR); Eon-sang Kim, Daejeon (KR); Minkyu Sung, Daejeon (KR); Seung-Hyun Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 468 days.

(21) Appl. No.: 18/106,640

(22) Filed: Feb. 7, 2023

(65) Prior Publication Data

US 2023/0269002 A1     Aug. 24, 2023

(30) Foreign Application Priority Data

Feb. 18, 2022     (KR) ........................ 10-2022-0021713

(51) Int. Cl.
| | |
|---|---|
| *H04B 10/516* | (2013.01) |
| *H04B 10/079* | (2013.01) |
| *H04Q 11/00* | (2006.01) |

(52) U.S. Cl.
CPC ..... *H04B 10/516* (2013.01); *H04B 10/07955* (2013.01); *H04Q 11/0005* (2013.01); *H04Q 11/0062* (2013.01); *H04Q 2011/0009* (2013.01)

(58) Field of Classification Search
CPC ........... H04B 10/516; H04B 10/07955; H04B 10/572; H04B 10/50572; H04B 10/5057;
(Continued)

(56) References Cited

U.S. PATENT DOCUMENTS

| | | | |
|---|---|---|---|
| 7,068,949 | B2 | 6/2006 | Jung et al. |
| 7,599,411 | B2 | 10/2009 | Kim et al. |

(Continued)

FOREIGN PATENT DOCUMENTS

| | | |
|---|---|---|
| KR | 10-2001-0093388 A | 10/2001 |
| KR | 10-2014-0059568 A | 5/2014 |

(Continued)

*Primary Examiner* — Hibret A Woldekidan
(74) *Attorney, Agent, or Firm* — LRK PATENT LAW FIRM

(57) ABSTRACT

An apparatus and method for maintaining a wavelength interval of light sources are disclosed. The apparatus for maintaining a wavelength interval of light sources includes: a plurality of light sources configured to output light having different wavelengths and having a certain wavelength interval; a light reception unit configured to receive an optical signal in which at least some of the output light of each of the plurality of light sources is combined and output an electrical signal including a frequency component corresponding to the certain wavelength interval; and a controller configured to detect the frequency component corresponding to the certain wavelength interval from the electrical signal and control a wavelength of each of the plurality of light sources to maintain the certain wavelength interval based on the detected frequency component.

12 Claims, 10 Drawing Sheets

(58) Field of Classification Search
CPC ................ H04B 10/564; H04B 10/506; H04Q
11/0005; H04Q 11/0062; H04Q
2011/0009
See application file for complete search history.

(56) References Cited

U.S. PATENT DOCUMENTS

| | | | |
|---|---|---|---|
| 7,848,652 B2 | 12/2010 | Lee et al. | |
| 8,155,488 B2 | 4/2012 | Nilsson et al. | |
| 2004/0114149 A1* | 6/2004 | Einstein ............... | H04B 10/572 |
| | | | 356/484 |
| 2013/0064542 A1* | 3/2013 | Eiselt ................... | H04B 10/572 |
| | | | 398/34 |

FOREIGN PATENT DOCUMENTS

| | | | |
|---|---|---|---|
| KR | 10-2014-0104801 A | 8/2014 | |
| WO | 01/73980 A1 | 10/2001 | |

* cited by examiner

| 320 → | 331 FILTERING UNIT | → | 332 MEASUREMENT UNIT | → | 333 WAVELENGTH CONTROLLER | → 310 |

Figure 8:
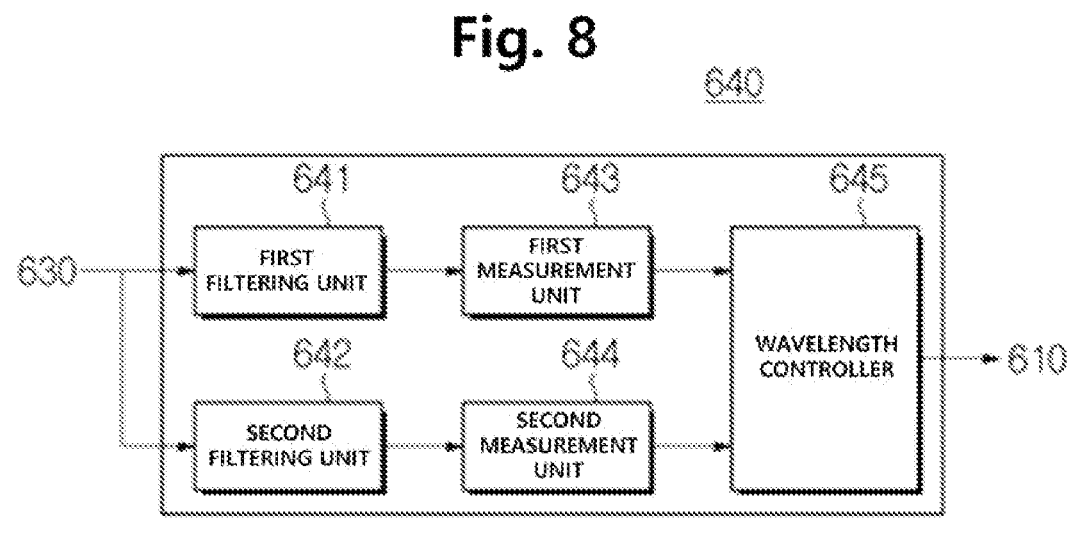

| 641 | 643 | 645 |
|-----|-----|-----|

630 →

FIRST FILTERING UNIT

FIRST MEASUREMENT UNIT

WAVELENGTH CONTROLLER → 610

642

SECOND FILTERING UNIT

644

SECOND MEASUREMENT UNIT

APPARATUS AND METHOD FOR MAINTAINING WAVELENGTH INTERVAL OF LIGHT SOURCES

CROSS-REFERENCE TO RELATED APPLICATION

This application claims priority to and the benefit of Korean Patent Application No. 10-2022-0021713, filed on Feb. 18, 2022, the disclosure of which is incorporated herein by reference in its entirety.

BACKGROUND

1. Field of the Invention

The present disclosure relates to an apparatus and method for maintaining a wavelength interval of light sources, and more specifically, to an apparatus and method for uniformly maintaining a wavelength interval of light sources in a system using a plurality of light sources.

2. Description of Related Art

In the case of an optical communication system using light sources having multiple wavelengths, such as a dense wavelength division multiplexing (DWDM) system or a light-based THz band communication system, an interval between the wavelengths needs to be uniformly maintained.

In order to uniformly maintain the interval between wavelengths, a technology using an optical comb and a technology using a multi-wavelength light source can be used as conventional technologies.

SUMMARY OF THE INVENTION

The present disclosure is directed to providing an apparatus and method for uniformly maintaining a wavelength interval of light sources in a system using a plurality of light sources.

Technical problems to be achieved in the present disclosure are not limited to the above-mentioned technical problems, and other technical problems which are not mentioned will be clearly understood by those skilled in the art from the following disclosure.

According to one embodiment of the present disclosure, an apparatus and method for maintaining a wavelength interval of light sources are disclosed. The apparatus for maintaining a wavelength interval of light sources according to one embodiment of the present disclosure includes: a plurality of light sources configured to output light having different wavelengths and having a certain wavelength interval; a light reception unit configured to receive an optical signal in which at least some of the output light of each of the plurality of light sources is combined and output an electrical signal including a frequency component corresponding to the certain wavelength interval; and a controller configured to detect the frequency component corresponding to the certain wavelength interval from the electrical signal and control a wavelength of each of the plurality of light sources to maintain the certain wavelength interval based on the detected frequency component.

In this case, the controller may include a filtering unit configured to band-pass filter the electrical signal to detect a frequency domain including the frequency component corresponding to the certain wavelength interval; a measurement unit configured to measure the power of the band-pass filtered electrical signal; and a wavelength controller configured to control the wavelength of each of the plurality of light sources to maintain the certain wavelength interval based on the measured power.

In this case, the wavelength controller may control the wavelength of each of the plurality of light sources so that the measured power may be maximized.

Further, the apparatus for maintaining a wavelength interval of light sources may further include: a plurality of first optical couplers configured to transmit (tap) at least some of the output light of each of the plurality of light sources; and a second optical coupler configured to combine the at least some of the output light transmitted from each of the plurality of first optical couplers and transmit the combined light to the light reception unit.

An apparatus for maintaining a wavelength interval of light sources according to another embodiment of the present disclosure includes: a plurality of light sources configured to output light having different wavelengths and having a certain wavelength interval; a modulator configured to receive an optical signal in which at least some of the output light of each of the plurality of light sources is combined, and modulate the optical signal to a sine wave of a preset first frequency and output the sine wave; a light reception unit configured to receive the optical signal modulated to the sine wave of the first frequency and output an electrical signal including a frequency component corresponding to the certain wavelength interval; and a controller configured to detect the frequency component corresponding to the certain wavelength interval from the electrical signal and control a wavelength of each of the plurality of light sources to maintain the certain wavelength interval based on the detected frequency component.

In this case, the light reception unit may output electrical signals of a first frequency domain and a second frequency domain including the frequency component corresponding to the certain wavelength interval for the received optical signal, and the controller may control the wavelength of each of the plurality of light sources to maintain the certain wavelength interval based on the frequency component detected from at least one frequency domain of the first frequency domain and the second frequency domain.

In this case, the controller may alternately perform wavelength control of each of the plurality of light sources based on power of the first frequency domain and wavelength control of each of the plurality of light sources based on power of the second frequency domain.

In this case, the controller may control the wavelength of each of the plurality of light sources to maintain the certain wavelength interval based on both the power of the first frequency domain and the power of the second frequency domain.

In this case, the controller may include a first filtering unit configured to band-pass filter an electrical signal to detect the first frequency domain; a second filtering unit configured to band-pass filter the electrical signal to detect the second frequency domain; a first measurement unit configured to measure the first power of the electrical signal of the first frequency domain; a second measurement unit configured to measure the second power of the electrical signal of the second frequency domain; and a wavelength controller configured to control the wavelength of each of the plurality of light sources to maintain the certain wavelength interval based on at least one of the measured first power and second power.

A method of maintaining a wavelength interval of light sources according to one embodiment of the present disclosure includes: receiving an electrical signal corresponding to an optical signal in which at least some of output light of each of the plurality of light sources having different wavelengths and having a certain wavelength interval is combined; detecting a frequency component corresponding to the certain wavelength interval from the received electrical signal; and controlling the wavelength of each of the plurality of light sources so that the certain wavelength interval is maintained based on the detected frequency component.

The features briefly summarized above for the present disclosure are merely exemplary aspects of detailed description of the present disclosure to be described below, and do not limit the scope of the present disclosure.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 5 is a view illustrating a configuration of an example of a controller in FIG. 3;

FIG. 8 is a view illustrating a configuration of an example of a controller in FIG. 6;

DETAILED DESCRIPTION OF EXEMPLARY EMBODIMENTS

Figure 1:
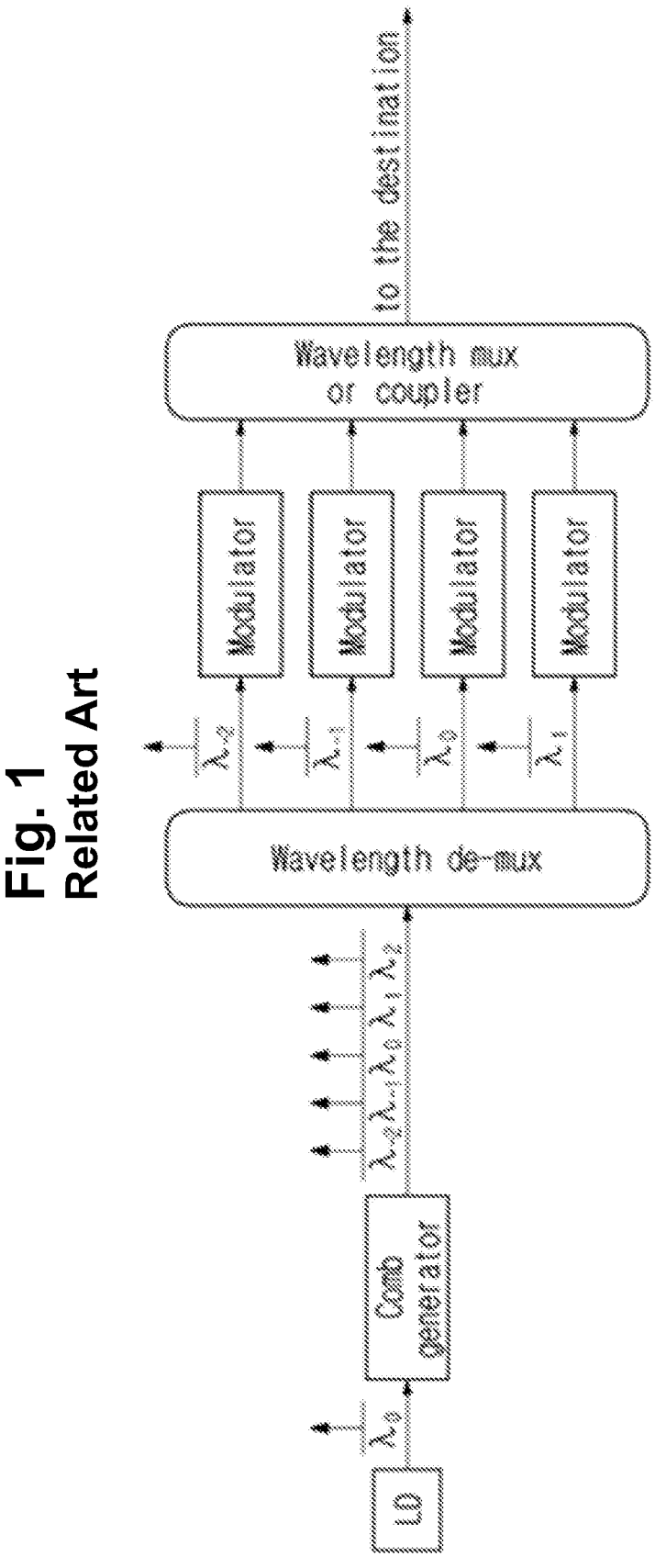
FIG. 1 is a view illustrating a wavelength division multiplexing (WDM) optical communication system structure using an optical comb according to a conventional embodiment.

Hereinafter, exemplary embodiments of the present disclosure will be described in detail with reference to the accompanying drawings which may allow one of ordinary skill in the art to easily carry out the present disclosure. The present disclosure may be implemented in various forms and is not limited to the following embodiments.

In the description of the present disclosure, when it is determined that detailed descriptions of related known components or functions may obscure principle of the present disclosure, the detailed descriptions thereof will be omitted.

Further, components not related to the present disclosure are omitted in the drawings, and like reference numerals are added to like components.

In the present disclosure, a case in which a certain component is "connected," "coupled," or "linked" to another component may include not only a direct connection relationship, but also an indirect connection relationship in which another component is present between the components. Further, a case in which a certain component "includes" or "has" another component means that other components may be further included, rather than excluding other components, unless otherwise disclosed.

In the present disclosure, terms such as "first," "second," and the like are used to only distinguish one component from another, and do not limit the order or importance of components unless otherwise specified. Accordingly, within the scope of the present disclosure, a first component in one embodiment may be referred to as a second component in another embodiment, and likewise, a second component in one embodiment may also be referred to as a first component in another embodiment.

In the present disclosure, components distinguished from each other are provided to describe each feature, and do not necessarily mean that the components are separated. That is, a plurality of components may be integrated to form a single hardware or software unit, or a single component may be distributed to form a plurality of hardware or software units. Accordingly, embodiments integrated or distributed like the above are included in the scope of the present disclosure even when not separately mentioned.

In the present disclosure, components described in various embodiments do not necessarily refer to essential components, and some components may be selective components. Accordingly, an embodiment composed of a subset of the components described in one embodiment is also included in the scope of the present disclosure. Further, an embodiment including other components in addition to the components described in various embodiments are also included in the scope of the present disclosure.

In the present disclosure, expressions of a position relationship used in the present specification, such as upper, lower, left, right, and the like, are described for convenience of description, and when the drawings shown in the present specification are viewed in reverse, the position relationship described in the specification may be interpreted in reverse.

Before describing the present disclosure, a conventional technology of uniformly maintaining a wavelength interval will be described as follows with reference to FIGS. 1 and 2.

FIG. 1 is a view illustrating a wavelength division multiplexing (WDM) optical communication system structure using an optical comb according to a conventional embodiment, and as shown in FIG. 1, the WDM optical communication system structure is a technology using an optical comb for uniformly maintaining a wavelength interval. In this technology, light having a plurality of wavelengths may be generated from light having one wavelength when the optical comb is generated using mode-locking technology or intensity/phase modulation technology, and in this case, multiple wavelength intervals are uniformly maintained. However, costs for meeting and maintaining optical comb generation conditions are required, and in order to respectively modulate the wavelengths to different pieces of data, the use of a wavelength demultiplexer such as arrayed wavelength grating (AWG) or the like and temperature control thereof is mandated. Further, since it is difficult to generate the desired number of wavelengths, wavelengths more than the required number are generated, and accordingly, energy loss occurs. In addition, an optical signal-to-noise ratio (OSNR) is relatively high.

There is a technology of uniformly maintaining a wavelength interval using a multi-wavelength light source as a technology of another conventional embodiment. However, the technology using a multi-wavelength light source may require a nonlinear medium or the like according to a generation method, and thus a system may be complicated. Further, since a plurality of wavelengths are generated from one light source like the case of an optical comb, a wavelength demultiplexer and temperature control thereof are required to separate the wavelengths, and additional noise such as mode partition noise or the like may be generated during a wavelength demultiplexing process.

Figure 2:
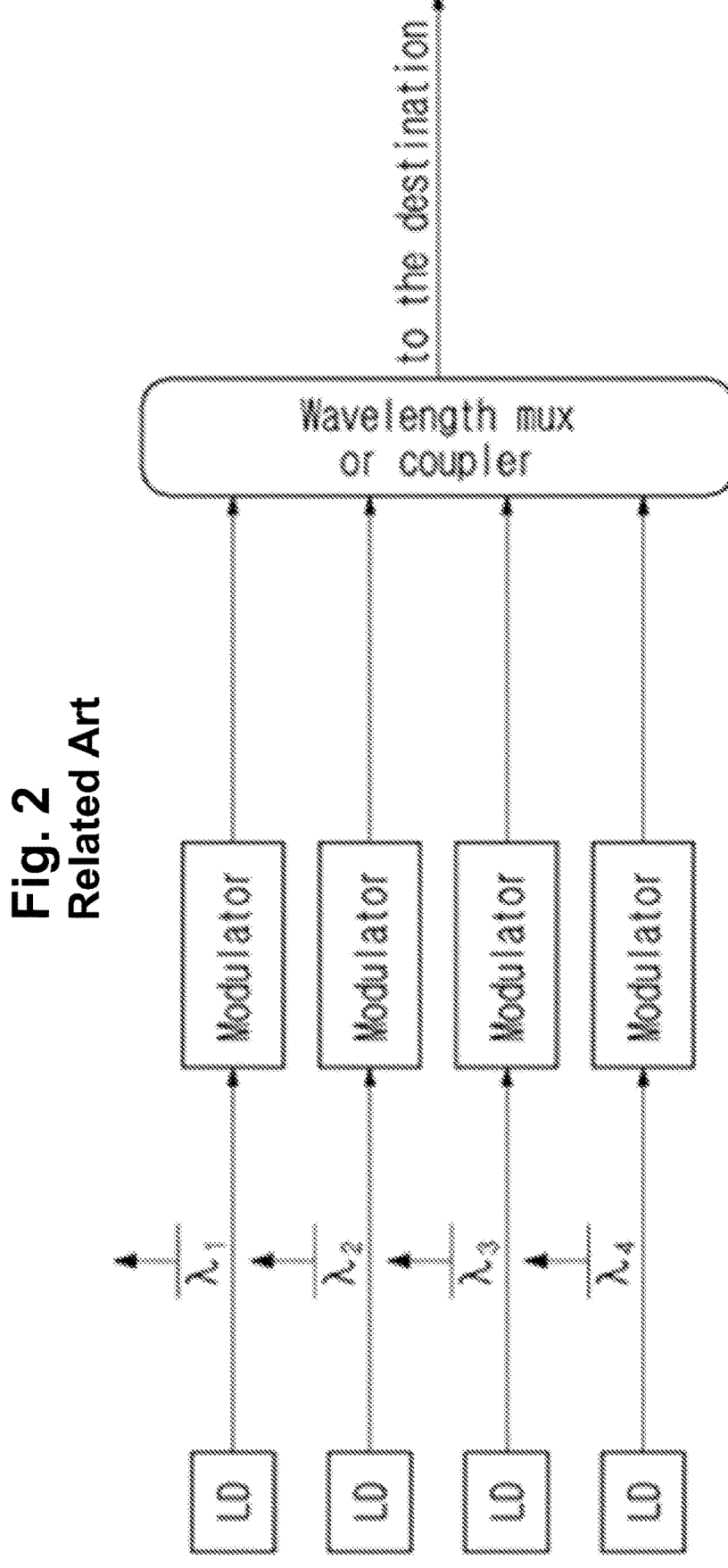
FIG. 2 is a view illustrating a WDM optical communication system structure using a plurality of light sources according to a conventional embodiment.

FIG. 2 is a view illustrating a WDM optical communication system structure using a plurality of light sources according to a conventional embodiment, and as shown in FIG. 2, the WDM optical communication system structure is a technology using a plurality of light sources having different wavelengths. In this technology, since laser diodes in a number corresponding to the desired number of wavelengths are used, there are various advantages in that a wavelength optical filter is not required and a high optical signal to noise ratio may be acquired, energy may be efficiently managed by turning off a light source of an unused wavelength, and the wavelength may be easily expanded in the future. However, since lights generated herein are free-running light sources that independently operate, a separate apparatus which uniformly maintains a wavelength interval of the light sources is required.

The present disclosures are provided to solve problems of the above-described related art, and an apparatus and method of the present disclosure will be described with reference to FIGS. 3 to 9.

Figure 3:
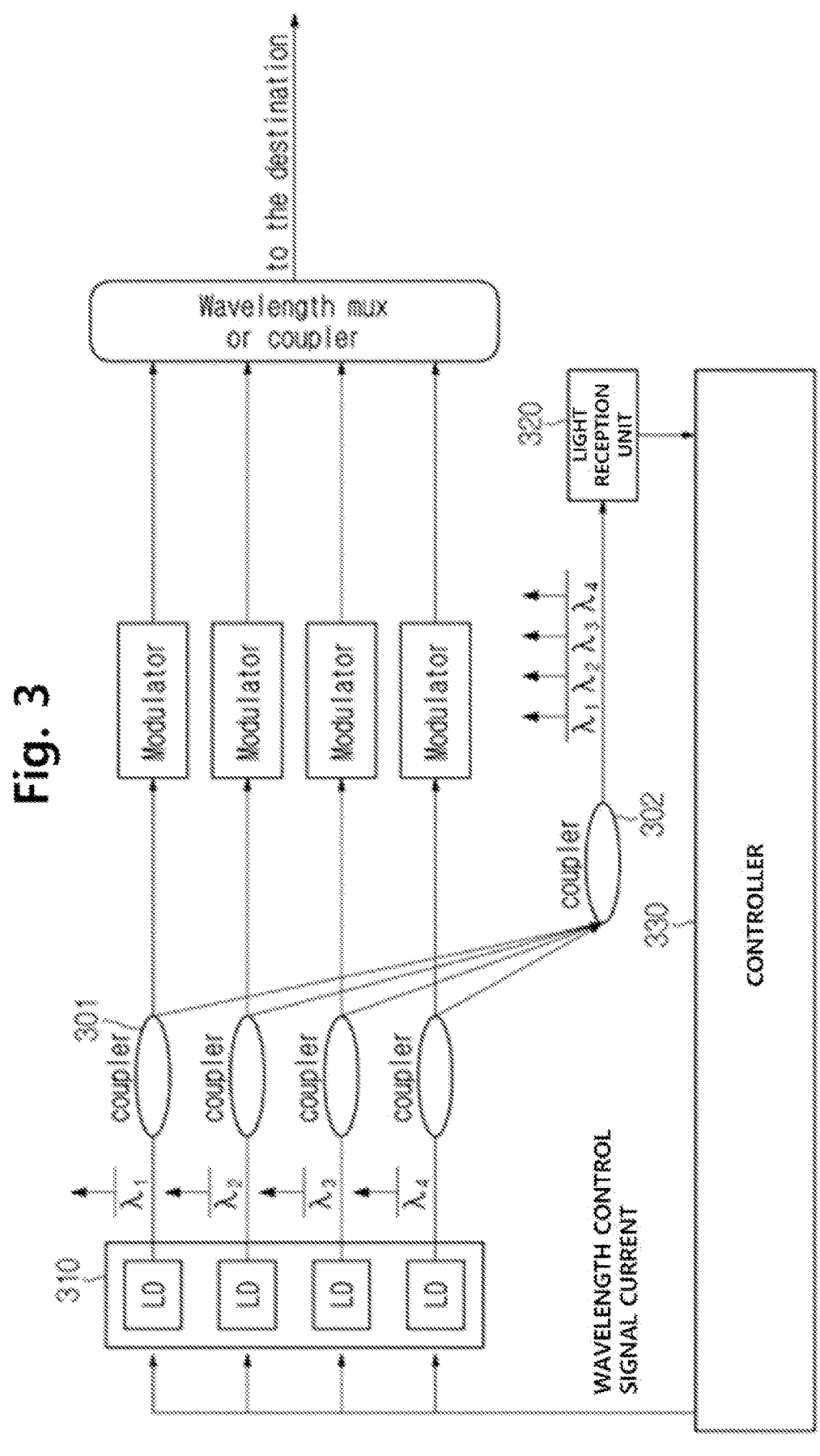
FIG. 3 is a view illustrating a system for describing an apparatus for maintaining a wavelength interval of light sources according to one embodiment of the present disclosure.

FIG. 3 is a view illustrating a system for describing an apparatus for maintaining a wavelength interval of light sources according to one embodiment of the present disclosure.

Referring to FIG. 3, an apparatus 300 for maintaining a wavelength interval of light sources according to the embodiment of the present disclosure includes a plurality of light sources 310 each outputting light having a different wavelength and having a certain wavelength interval, a plurality of first optical couplers 301 which transmit (taps) at least some of output light of each of the plurality of light sources to a second optical coupler 302, the second optical coupler 302 which combines the at least some of the output light transmitted from the plurality of first optical couplers 301 and outputs the combined light, a light reception unit 320 which receives a combined optical signal transmitted from the second optical coupler 302 and outputs an electrical signal including a frequency component corresponding to the certain wavelength interval, and a controller 330 which detects the frequency component corresponding to the certain wavelength interval from the electrical signal and controls a wavelength of each of the plurality of light sources to maintain the certain wavelength interval based on the detected frequency component.

The light sources 310 may output light having a certain wavelength interval with wavelengths of neighboring light sources while outputting the output light of a preset wavelength. For example, when the number of light sources is four, a first light source LD1 may output light having a wavelength $\lambda_1$, a second light source LD2 may output light having a wavelength $\lambda_2$, a third light source LD3 may output light having a wavelength $\lambda_3$, and a fourth light source LD4 may output light having a wavelength of $\lambda_4$. In this case, a wavelength interval ($\lambda_1$-$\lambda_2$) between the first light source LD1 and the second light source LD2, a wavelength interval ($\lambda_2$-$\lambda_3$) between the second light source LD2 and the third light source LD3, and a wavelength interval ($\lambda_3$-$\lambda_4$) between the third light source LD3 and the fourth light source LD4 may all have the same interval, that is, a certain wavelength interval. However, since the wavelength of the light output from the light source may change over time or due to a manufacturing process, a surrounding environment, and the like, the wavelength interval between the light sources may change as time passes, and due to the change in the wavelength interval, problems occur. The present disclosure is provided to uniformly maintain the wavelengths and wavelength interval which may change over time or due to a manufacturing process, a surrounding environment, or the like. The first optical couplers 301 may perform a function of tapping at least some of the output light output from each of the light sources 310 and then transmitting the tapped at least some of the output light to the second optical coupler 302, and may include a light distributor.

The second optical coupler 302 combines optical signals of different wavelengths transmitted from the first optical couplers 301 and then outputs the combined optical signals as a single optical signal, and may output an optical signal including a plurality of wavelengths to the light reception unit 320. In this case, the second optical coupler 302 may include an optical coupler.

The light reception unit 320 converts the optical signal transmitted from the second optical coupler 302 into an electrical signal and then outputs the electrical signal, and may include a photodiode (PD).

In this case, the light reception unit 320 may output an electrical signal including a frequency component corresponding to a certain wavelength interval between the light sources by beating the wavelengths included in the optical signal with each other.

Figure 4:
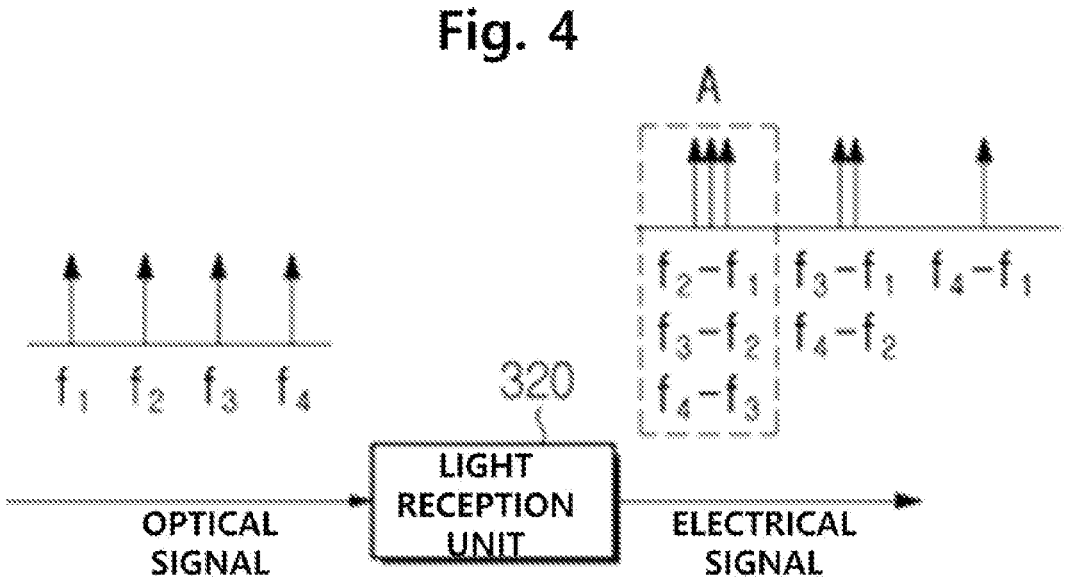
FIG. 4 is a view for describing a frequency of an output signal of a light reception unit in FIG. 3.

For example, as shown in FIG. 4, when it is assumed that frequencies included in the optical signal are $f_1$, $f_2$, $f_3$, and $f_4$, the electrical signal output from the light reception unit 320 includes frequency components $f_2$-$f_1$, $f_3$-$f_2$, $f_4$-$f_3$, $f_4$-$f_2$, and $f_4$-$f_1$ corresponding to differences between the frequencies. Here, the frequency components $f_2$-$f_1$, $f_3$-$f_2$, and $f_4$-$f_3$ are frequencies having relatively low frequencies, are frequency components corresponding to a certain wavelength interval, and are the same as the wavelength interval between the plurality of light sources 310. Accordingly, in the apparatus of the present disclosure, when a frequency interval corresponding to a desired wavelength interval is $\Delta f$, the wavelength of each of the light sources 310, for example, laser diodes, may be controlled so that all of $f_2$-$f_1$, $f_3$-$f_2$, and $f_4$-$f_3$ become $\Delta f$.

The controller 330 detects the frequency component corresponding to $\Delta f$ in the electrical signal, and then controls the wavelength of each of the light sources 310 through a wavelength control algorithm so that the power of the electrical signal including the corresponding frequency component is maximized.

Figure 5:
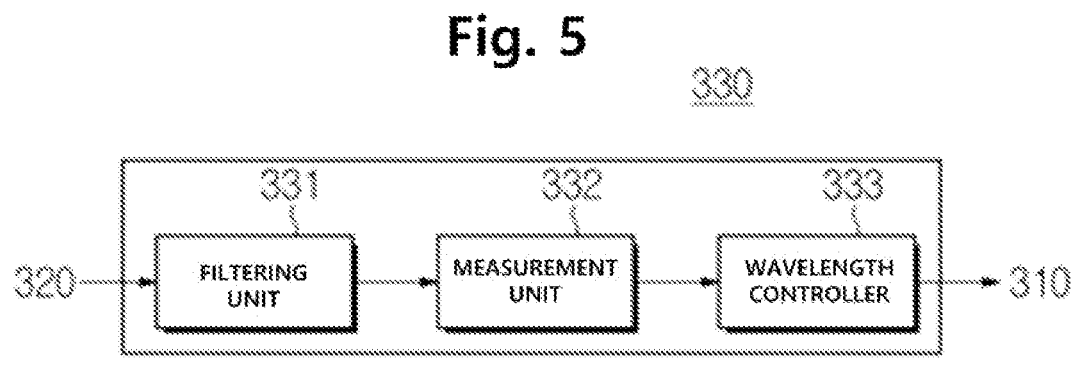

In this case, as shown in FIG. 5, the controller 330 may include a filtering unit 331, a measurement unit 332, and a wavelength controller 333.

The filtering unit 331 band-pass filters a frequency domain (for example, A in FIG. 4) including the frequency component corresponding to $\Delta f$ of the electrical signal output from the light reception unit 320 to detect the electrical signal in the frequency domain including the frequency component corresponding to $\Delta f$.

7

The measurement unit 332 measures the power of the band-pass filtered electrical signal having only the frequency component corresponding to Δf.

The wavelength controller 333 controls the wavelength of each of the light sources 310 through the wavelength control algorithm so that the power of the frequency component corresponding to Δf measured by the measurement unit 332 is maximized. As a result, as the wavelength of each of the light sources 310 is controlled so that all of frequency intervals $f_2-f_1$, $f_3-f_2$, and $f_4-f_3$ become the same as Δf, the output light output from each of the light sources 310 maintains the certain wavelength interval.

Here, the wavelength control algorithm may include a gradient descent algorithm, a least mean squares (LMS) algorithm, or the like, and may also include all types of algorithms capable of controlling the wavelength. As an example of a method of controlling a wavelength of a light source such as a laser diode, the wavelength may be controlled using a method of controlling the current flowing through a temperature control circuit attached to a laser using the property that an oscillation wavelength of the laser changes when the temperature of the laser changes.

Figure 6:
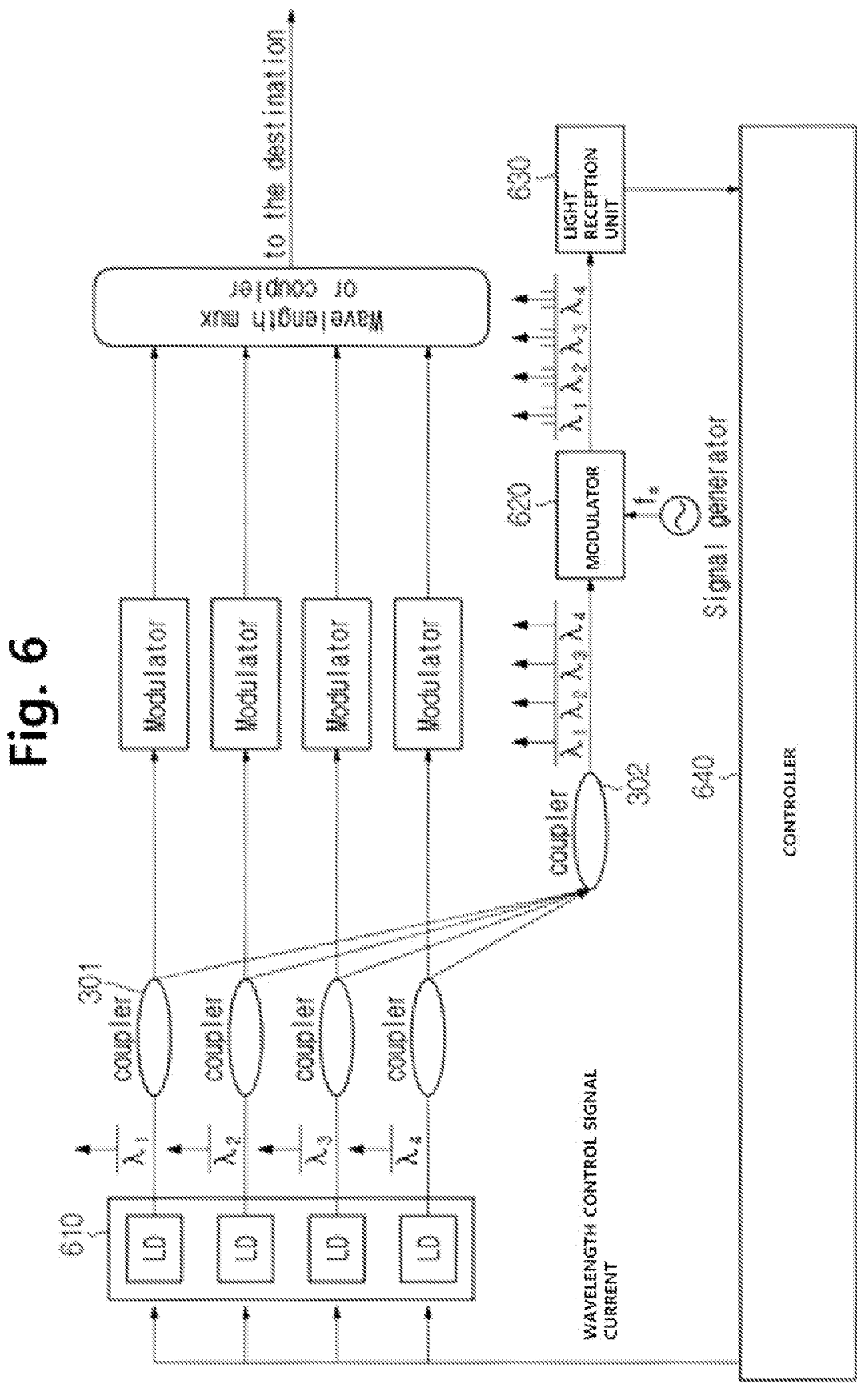
FIG. 6 is a view illustrating a system for describing an apparatus for maintaining a wavelength interval of light sources according to another embodiment of the present disclosure.
Figure 7:
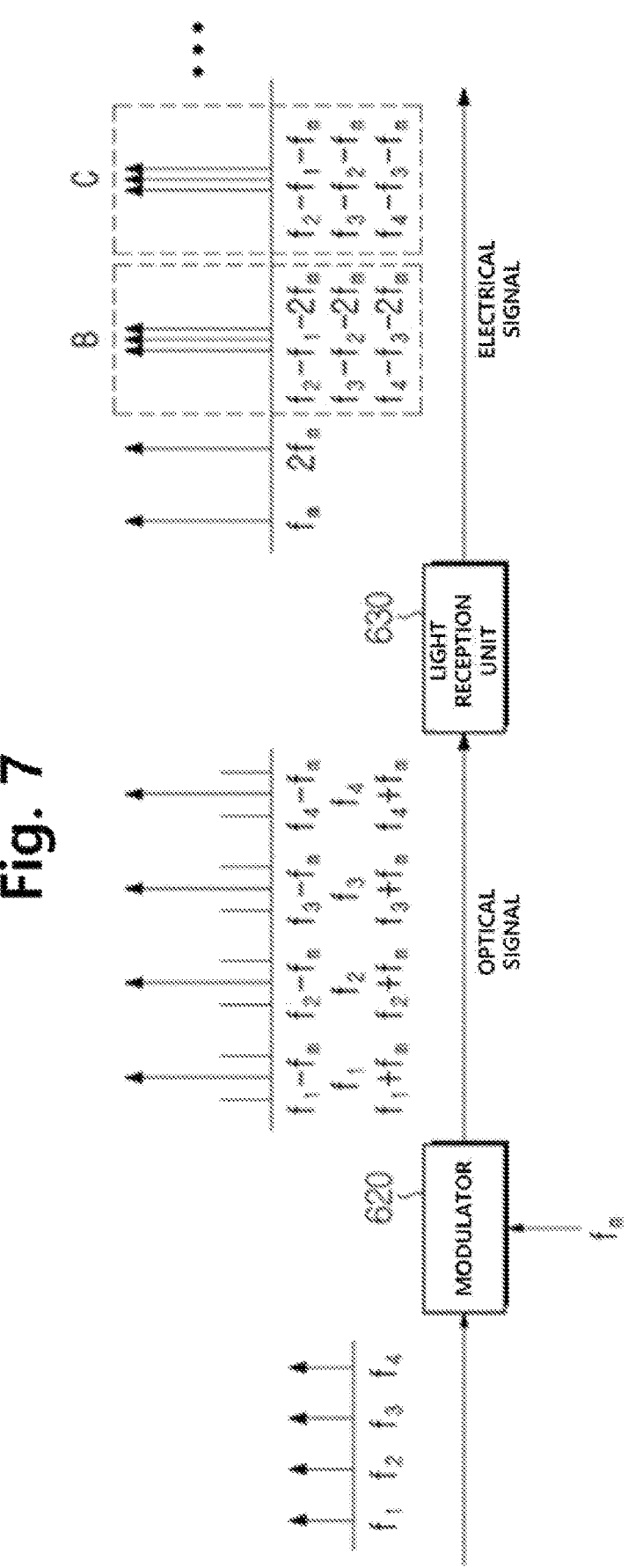
FIG. 7 is a view for describing a frequency of an output signal of a light reception unit in FIG. 6.

In the above-described FIGS. 3 to 5, since the light reception unit 320 should receive a signal of a frequency Δf corresponding to Δλ, a bandwidth of the light reception unit 320 should be greater than or equal to Δλ. In this case, the bandwidth of the light reception unit 320, for example, a photodiode, may increase, and thus costs may increase. FIGS. 6 to 8 are provided to prevent an increase in the bandwidth of the photodiode, and will be described as follows.

FIG. 6 is a view illustrating a system for describing an apparatus for maintaining a wavelength interval of light sources according to another embodiment of the present disclosure.

Referring to FIG. 6, an apparatus 600 for maintaining a wavelength interval of light sources according to another embodiment of the present disclosure includes a plurality of light sources 610 each outputting light having a different wavelength and having a certain wavelength interval, a plurality of first optical couplers 301 which transmit (taps) at least some of output light of each of the plurality of light sources 610 to a second optical coupler 302, the second optical coupler 302 which combines the at least some of the output light transmitted from the plurality of first optical couplers 301 and outputs the combined light, a modulator 620 which receives a combined optical signal transmitted from the second optical coupler 302, and then modulates the combined optical signal to a sine wave of a preset frequency f and outputs the sine wave, a light reception unit 630 which receives the optical signal modulated to the sine wave of the preset frequency $f_m$ and then outputs an electrical signal including a frequency component corresponding to the certain wavelength interval, and a controller 640 which detects the frequency component corresponding to the certain wavelength interval from the electrical signal and controls a wavelength of each of the plurality of light sources 610 to maintain the certain wavelength interval based on the detected frequency component.

The light sources 610 may output light having a certain wavelength interval with wavelengths of neighboring light sources while outputting the output light of a preset wavelength. For example, when the number of light sources is four, a first light source LD1 may output light having a wavelength $\lambda_1$, a second light source LD2 may output light having a wavelength $\lambda_2$, a third light source LD3 may output light having a wavelength $\lambda_3$, and a fourth light source LD4 may output light having a wavelength of $\lambda_4$. In this case, a wavelength interval $(\lambda_1-\lambda_2)$ between the first light source LD1 and the second light source LD2, a wavelength interval $(\lambda_2-\lambda_3)$ between the second light source LD2 and the third light source LD3, and a wavelength interval $(\lambda_3-\lambda_4)$ between the third light source LD3 and the fourth light source LD4 may all have the same interval. However, since the wavelength of the light output from the light source may change over time or due to a manufacturing process, a surrounding environment, and the like, the wavelength interval between the light sources may change as time passes, and due to the change in the wavelength interval, problems occur. The present disclosure is provided to uniformly maintain the wavelengths and the wavelength interval which may change over time or due to a manufacturing process, a surrounding environment, or the like.

The first optical couplers 301 may perform a function of tapping at least some of the output light output from each of the light sources 610 and then transmitting the tapped at least some of the output light to the second optical coupler 302, and may include a light distributor.

The second optical coupler 302 combines optical signals of different wavelengths transmitted from the first optical couplers 301 and then outputs the combined optical signals as a single optical signal, and may output an optical signal having a plurality of wavelengths to the modulator 620. In this case, the second optical coupler 302 may include an optical coupler.

The modulator 620 modulates the optical signal input to the light reception unit 630 to the sine wave of the preset frequency $f_m$ to lower a frequency bandwidth of the optical signal.

For example, as shown in FIG. 7, when it is assumed that frequencies included in the optical signal are $f_1$, $f_2$, $f_3$, and $f_4$, as the modulator 620 modulates an optical signal having the frequencies of $f_1$, $f_2$, $f_3$, and $f_4$ to the sine wave of the frequency $f_m$, each frequency has side tones at distances $f_m$ on both sides of an original frequency by. That is, the frequency $f_1$ has side tones of $f_1-f_m$ and $f_1+f_m$, the frequency $f_2$ has side tones of $f_2-f_m$ and $f_2+f_m$, the frequency $f_3$ has side tones of $f_3-f_m$ and $f_3+f_m$, and the frequency $f_4$ has side tones of $f_4-f_m$ and $f_4+f_m$.

The light reception unit 630 converts the optical signal transmitted from the modulator 620, that is, the optical signal having the original frequency and side tones of the original frequency, into an electrical signal and outputs the converted electrical signal, and may include a photodiode.

In this case, the light reception unit 630 may output an electrical signal including a frequency component corresponding to a certain wavelength interval between the light sources by beating the wavelengths included in the optical signal with each other.

For example, as shown in FIG. 7, since the optical signal having the original frequency and side tones of the original frequency is beaten by the light reception unit 630, the light reception unit 630 outputs an electrical signal including frequency components $f_m$, $2f_m$, $f_2-f_1-2f_m$, $f_3-f_2-2f_m$, $f_4-f_3-2f_m$, $f_2-f_1-f_m$, $f_3-f_2-f_m$, $f_4-f_3-f_m$, and the like corresponding to a difference therebetween. As shown in FIG. 7, in the electrical signal output by the light reception unit 630, it can be seen that the frequency components corresponding to the certain wavelength interval are included in a frequency domain B corresponding to $f_2-f_1-2f_m$, $f_3-f_2-2f_m$, and $f_4-f_3-2f_m$ and a frequency domain C corresponding to $f_2-f_1-f_m$, $f_3-f_2-f_m$, and $f_4-f_3-f_m$. That is, when compared to FIG. 4, since the bandwidth may be reduced to be smaller than or equal to $f_m$ while including the frequency components corresponding to the predetermined wavelength, the bandwidth of the photodiode may be lowered, and accordingly, an increase in costs according to an increase in the bandwidth of the photodiode may be prevented.

Accordingly, the apparatus 600 according to another embodiment of the present disclosure may control the wavelength of each of the light sources, for example, laser diodes, using the frequency components $f_2-f_1-2f_m$, $f_3-f_2-2f_m$, and $f_4-f_3-2f_m$ included in the first frequency domain B of the electrical signal or the frequency components $f_2-f_1-f_m$, $f_3-f_2-f_m$, and $f_4-f_3-f_m$ included in the second frequency domain C of the electrical signal so that all of frequency intervals $f_2-f_1$, $f_3-f_2$, and $f_4-f_3$ corresponding to the desired wavelength interval may become $\Delta f$.

The controller 640 detects the frequency component of at least one frequency domain of the first frequency domain B and the second frequency domain C, that is, at least one frequency component of $\Delta f-2f_m$ and $\Delta f-f_m$ in the electrical signal, and then controls the wavelength of each of the light sources through a wavelength control algorithm so the corresponding frequency component is maximized.

Figure 9:
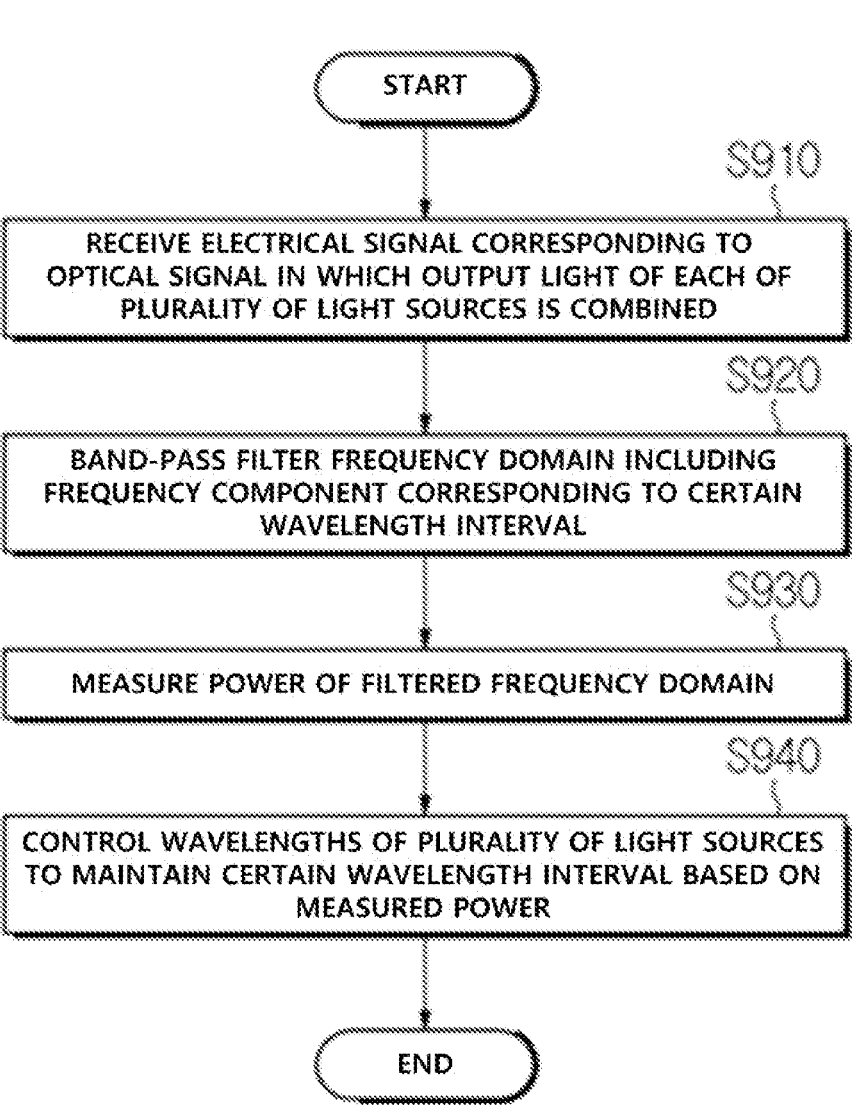
FIG. 9 is a flow chart of a method of maintaining a wavelength interval of light sources according to still another embodiment of the present disclosure.

In this case, as shown in FIG. 9, the controller 640 may include a first filtering unit 641, a second filtering unit 642, a first measurement unit 643, a second measurement unit 644, and a wavelength controller 645.

The first filtering unit 641 band-pass filters the first frequency domain B, that is, the frequency domain including the frequency component corresponding to $\Delta f-2f_m$ of the electrical signal output from the light reception unit 630 to detect only the frequency component corresponding to $\Delta f-2f_m$.

The second filtering unit 642 band-pass filters the second frequency domain C, that is, the frequency domain including the frequency component corresponding to $\Delta f-f_m$ of the electrical signal output from the light reception unit 630 to detect only the frequency component corresponding to $\Delta f-f_m$.

The first measurement unit 643 measures the power of the electrical signal having only the frequency component corresponding to $\Delta f-2f_m$ band-pass filtered by the first filtering unit 641.

The second measurement unit 644 measures the power of the electrical signal having only the frequency component corresponding to $\Delta f-f_m$ band-pass filtered by the second filtering unit 642.

The wavelength controller 645 controls the wavelength of each of the light sources 610 through a wavelength control algorithm so that the power measured by at least one of the first measurement unit 643 and the second measurement unit 644 is maximized.

According to one embodiment, the wavelength controller 645 may control the wavelength of each of the light sources 610 so that the wavelengths between the light sources may maintain the certain interval by alternately performing a process of controlling the wavelength of each of the light sources 610 so that the power measured by the first measurement unit 643 is maximized and a process of controlling the wavelength of each of the light sources 610 so that the power measured by the second measurement unit 644 is maximized.

According to another embodiment, as the wavelength of each of the light sources 610 is controlled so that both the power measured by the first measurement unit 643 and the power measured by the second measurement unit 644 are maximized, for example, an average of the power measured by the first measurement unit 643 and the power measured by the second measurement unit 644 is maximized, the wavelength controller 645 may control the wavelengths so that the wavelength intervals between the light sources may be maintained at the certain interval.

Of course, the apparatus 600 in FIG. 6 may control the wavelength of each of the light sources using only the power of one frequency domain as shown in FIG. 3, and may control the wavelength of each of the light sources using only the power of a first frequency domain during a certain period and using only the power of a second frequency domain during a next certain period in addition to alternately controlling two frequency domains, and when a problem in controlling using the corresponding frequency domain occurs while controlling using only one frequency domain of the first frequency domain and the second frequency domain, the wavelengths of the light sources may be controlled using another frequency domain. Like the above, the apparatus 600 in FIG. 6 may control the wavelength of each of the light sources in various ways.

As a result, as the controller 640 controls the wavelength of each of the light sources 610 so that all of the frequency intervals $f_2-f_1$, $f_3-f_2$, and $f_4-f_3$ corresponding to the wavelength intervals included in the first frequency domain B or the second frequency domain C become the same as $\Delta f$, the output light output from each of the light sources may maintain the certain wavelength interval.

Here, the wavelength control algorithm may include a gradient descent algorithm, a least mean squares (LMS) algorithm, or the like, and may also include all types of algorithms capable of controlling the wavelength. As an example of a method of controlling the wavelength of a light source such as a laser diode, the wavelength may be controlled using a method of controlling the current flowing through a temperature control circuit attached to a laser using the property that an oscillation wavelength of the laser changes when the temperature of the laser changes.

Although FIGS. 6 to 8 describe that both two frequency domains, that is, the first frequency domain B and the second frequency domain C including the frequency intervals corresponding to the wavelength intervals are band-pass filtered, and then the wavelength of each of the light sources is controlled based on the power for at least one frequency domain, the present disclosure is not limited thereto, and only one frequency domain may be band-pass filtered, and then the wavelength of each of the light sources may be controlled based on the power of the corresponding frequency domain. For example, as a frequency of a band-pass filter is set to $\Delta f-2f_m$ or $\Delta f-f_m$ and the wavelengths of the light sources 610, for example, laser diodes, are controlled so that output power of the band-pass filter is maximized, the controller 640 may uniformly maintain the frequency interval between the light sources at $\Delta f$.

Like the above, each of the apparatuses according to embodiments of the present disclosure may uniformly maintain wavelength intervals between light sources in a system using a plurality of light sources having different wavelengths.

Compared to the related art, each of the apparatuses according to embodiments of the present disclosure may uniformly maintain the wavelength interval while acquiring a benefit using a free-running light source. Here, the benefit according to use of the free-running light source may include a benefit in which a wavelength optical filter is not required and a high OSNR may be acquired, energy may be efficiently managed by turning off a light source of an unused wavelength, and the wavelength may be easily expanded in the future.

FIG. 9 is a flow chart of a method of maintaining a wavelength interval of light sources according to still another embodiment of the present disclosure. FIG. 9 illustrates a flow chart of a method of maintaining the wavelength intervals of the light sources in the apparatuses in FIGS. 3 to 8, and is a view illustrating operations in the controller.

Referring to FIG. 9, in the method of maintaining the wavelength interval of the light sources of the present disclosure, an electrical signal corresponding to an optical signal in which output light of each of the plurality of light sources is combined is received, and a frequency domain including the frequency component corresponding to a certain wavelength interval among the frequency domains of the electrical signal is band-pass filtered (S910 and S920).

Here, in operation S910, as described above, the apparatus may beat the optical signal including the frequency component of each of the light sources to receive the electrical signal including the frequency component corresponding to the wavelength interval between the light sources through a photodiode.

In this case, in operation S910, the optical signal in which at least some of the output light of each of the plurality of light sources is combined may be modulated to a sine wave of a preset first frequency $f_m$, and an electrical signal corresponding to the optical signal modulated to the sine wave of the first frequency $f_m$ may be received. In this case, as the electrical signal received in operation S910 includes a first frequency domain and a second frequency domain including the frequency components corresponding to the certain wavelength interval, and at least one frequency domain of the first frequency domain and the second frequency domain is band-pass filtered in operation S920, at least one frequency component of the frequency component corresponding to the certain wavelength interval included in the first frequency domain and the frequency component corresponding to the certain wavelength interval included in the second frequency domain may be detected.

When the frequency component corresponding to the certain wavelength interval is band-pass filtered in operation S920, the band-pass filtered frequency domain, that is, the power of the frequency domain having the frequency component corresponding to the certain wavelength interval is measured (S930).

Here, in operation S930, when the first frequency domain and the second frequency domain are band-pass filtered, the power for the electrical signal of the first frequency domain may be measured, and the power for the electrical signal of the second frequency domain may be measured. That is, depending on circumstances, in operation S930, only the power for one frequency domain may be measured, the power for both frequency domains may be measured, and the power for one frequency domain may be measured and then the power in the other frequency domain may be measured. This may be determined by an licensee or individual providing the technology of the present disclosure.

When the electrical signal in the frequency domain including the frequency component of the wavelength interval is measured in operation S930, the wavelength of each of the plurality of light sources may be controlled to maintain the certain wavelength interval between the light sources based on the measured power (S940).

According to the embodiment, in operation S940, the wavelength of each of the light sources may be controlled through a wavelength control algorithm so that the power measured in any one of the first frequency domain and the second frequency domain may be maximized.

According to another embodiment, in operation S940, the wavelength of each of the light sources may controlled so that the wavelengths between the light sources may maintain the certain interval by alternately performing a process of controlling the wavelength of each of the light sources so that the power measured in the first frequency domain is maximized and a process of controlling the wavelength of each of the light sources so that the power measured in the second frequency domain is maximized.

According to still another embodiment, in operation S940, as the wavelength of each of the light sources is controlled so that both the power measured in the first frequency domain and the power measured in the second frequency domain are maximized, for example, an average of the power measured in the first frequency domain and the power measured in the second frequency domain is maximized, the wavelength of each of the light sources may controlled so that the wavelength intervals between the light sources may be maintained at the certain interval.

Although the description is omitted for FIG. 9, the method of the present disclosure may include all contents described for FIGS. 3 to 8.

Figure 10:
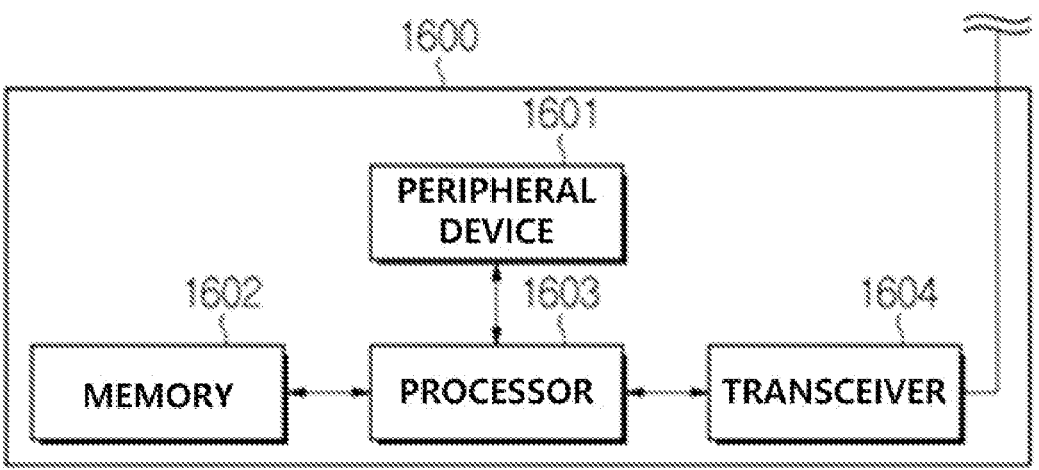
FIG. 10 is a view illustrating a configuration diagram of a device to which the apparatus for maintaining a wavelength interval of light sources according to the embodiment of the present disclosure is applied.

FIG. 10 is a view illustrating a configuration diagram of a device to which the apparatus for maintaining a wavelength interval of light sources according to the embodiment of the present disclosure is applied.

For example, a device 1600 in FIG. 10 may be the apparatus for maintaining a wavelength interval of light sources according to one embodiment of the present disclosure in FIG. 3. Referring to FIG. 10, the device 1600 may include a memory 1602, a processor 1603, a transceiver 1604, and a peripheral device 1601. Further, for example, the device 1600 may further include other configurations, and is not limited to the above-described embodiment. In this case, the device 1600 may be, for example, a portable user terminal (for example, a smart phone, a laptop computer, a wearable device, or the like) or a fixed management apparatus (for example, a server, a PC, or the like).

More specifically, the device 1600 in FIG. 10 may be an exemplary hardware/software architecture such as a WDM optical communication system, a sensing system or apparatus, or the like. In this case, for example, the memory 1602 may be a non-removable memory or a removable memory. Further, for example, the peripheral device 1601 may include a display, a global positioning system (GPS), or other peripheral devices, and is not limited to the above-described embodiment.

Further, for example, the above-described device 1600 may include a communication circuit like the transceiver 1604, and may perform communication with an external device based on this.

Further, for example, the processor 1603 may be one or more of a general purpose processor, a digital signal processor (DSP), a DSP core, a controller, a microcontroller, application specific integrated circuits (ASICs), field programmable gate array (FPGA) circuits, any other type of an integrated circuit (IC), and one or more microprocessors associated with a state machine. That is, the processor 1603 may be a hardware/software configuration which performs a control role for controlling the above-described device 1600. Further, the processor 1603 may modularize and perform functions of the above-described controller 330 in FIG. 3.

In this case, the processor 1603 may execute computer-executable instructions stored in the memory 1602 to perform various essential functions of the apparatus for maintaining a wavelength interval of light sources. For example, the processor 1603 may control at least one of signal coding, data processing, power control, input/output processing, and communication operations. Further, the processor 1603 may control a physical layer, a medium access control (MAC) layer, and an application layer. In addition, for example, the processor 1603 may perform authentication and security procedures in an access layer and/or application layer, and is not limited to the above-described embodiment.

For example, the processor 1603 may communicate with other apparatuses through the transceiver 1604. For example, the processor 1603 may control the apparatus for maintaining a wavelength interval of light sources by executing the computer-executable instructions so that the apparatus for maintaining a wavelength interval of light sources may communicate with other apparatuses through a network. That is, the communication performed in the present disclosure may be controlled. For example, the transceiver 1604 may transmit a radio frequency (RF) signal through an antenna, and may transmit a signal based on various communication networks.

Further, for example, a multi-input multi-output (MIMO) technology, beam forming, or the like may be applied as an antenna technology, and is not limited to the above-described embodiment. In addition, the signal transmitted and received through the transceiver 1604 may be modulated and demodulated, and then controlled by the processor 1603, and is not limited to the above-described embodiment.

Exemplary methods of the present disclosure are expressed as a series of operations for clarity of description, but this is not to limit the order in which the operations are performed, and the operations may be performed simultaneously or in a different order as necessary. In order to implement the method according to the present disclosure, other operations may be included in addition to the exemplified operations, the remaining operations may be included except for some operations, or additional other operations may be included except for some operations.

Various embodiments of the present disclosure are not intended to list all possible combinations but are intended to describe representative aspects of the present disclosure, and items described in the various embodiments may be applied independently or in combination of two or more.

Further, the various embodiments of the present disclosure may be implemented by hardware, firmware, software, or a combination thereof. For implementation by hardware, implementation may be carried out by one or more application specific integrated circuits (ASICs), digital signal processors (DSPs), digital signal processing devices (DSPDs), programmable logic devices (PLDs), field programmable gate arrays (FPGAs), general processors, controllers, microcontrollers, microprocessors, or the like.

The scope of the present disclosure includes software (for example, an operating system, an application, firmware, a program, or the like) or machine-executable instructions which cause operations according to the methods of the various embodiments to be executed on an apparatus or a computer, and a non-transitory computer-readable medium in which such software or instructions are stored and executable on an apparatus or computer.

According to the present disclosure, an apparatus and method for uniformly maintaining a wavelength interval of light sources in a system using a plurality of light sources can be provided.

According to the present disclosure, a wavelength interval can be uniformly maintained while acquiring a benefit as a free-running light source is used.

Effects which may be acquired in the present disclosure are not limited to the above-mentioned effects, and other effects which are not mentioned will be clearly understood by those skilled in the art from the following disclosure.

What is claimed is:

1. An apparatus for maintaining a wavelength interval of light sources, comprising:
a plurality of light sources configured to output light having different wavelengths and having a certain wavelength interval;
a light reception unit configured to receive an optical signal in which at least some of the output light of each of the plurality of light sources is combined and output an electrical signal including a frequency component corresponding to the certain wavelength interval; and
a controller configured to detect the frequency component corresponding to the certain wavelength interval from the electrical signal and control a wavelength of each of the plurality of light sources to maintain the certain wavelength interval based on the detected frequency component,
wherein the certain wavelength interval between adjacent light is identical between the plurality of light that the light sources output,
wherein the controller includes:
a filtering unit configured to band-pass filter the electrical signal to detect a frequency domain including the frequency component corresponding to the certain wavelength interval;
a measurement unit configured to measure power of the band-pass filtered electrical signal; and
a wavelength controller configured to control the wavelength of each of the plurality of light sources to maintain the certain wavelength interval based on the measured power.

2. The apparatus of claim 1, wherein the wavelength controller controls the wavelength of each of the plurality of light sources so that the measured power is maximized.

3. The apparatus of claim 1, further comprising:
a plurality of first optical couplers configured to transmit (tap) the at least some of the output light of each of the plurality of light sources; and
a second optical coupler configured to combine the at least some of the output light transmitted from each of the plurality of first optical couplers and transmit the combined light to the light reception unit.

4. An apparatus for maintaining a wavelength interval of light sources, comprising:
a plurality of light sources configured to output light having different wavelengths and having a certain wavelength interval;
a modulator configured to receive an optical signal in which at least some of the output light of each of the plurality of light sources is combined, and modulate the optical signal to a sine wave of a preset first frequency and output the sine wave;
a light reception unit configured to receive the optical signal modulated to the sine wave of the first frequency and output an electrical signal including a frequency component corresponding to the certain wavelength interval; and
a controller configured to detect the frequency component corresponding to the certain wavelength interval from the electrical signal and control a wavelength of each of the plurality of light sources to maintain the certain wavelength interval based on the detected frequency component, wherein:

the certain wavelength interval between adjacent light is identical between the plurality of light that the light sources output, the light reception unit outputs electrical signals of a first frequency domain and a second frequency domain including the frequency component corresponding to the certain wavelength interval for the received optical signal, the controller controls the wavelength of each of the plurality of light sources to maintain the certain wavelength interval based on the frequency component detected from at least one frequency domain of the first frequency domain and the second frequency domain, and the controller alternately performs wavelength control of each of the plurality of light sources based on power of the first frequency domain and wavelength control of each of the plurality of light sources based on power of the second frequency domain.

5. The apparatus of claim 4, wherein the controller controls the wavelength of each of the plurality of light sources to maintain the certain wavelength interval based on both power of the first frequency domain and power of the second frequency domain.

6. The apparatus of claim 4, wherein the controller includes:

a first filtering unit configured to band-pass filter an electrical signal to detect the first frequency domain;

a second filtering unit configured to band-pass filter the electrical signal to detect the second frequency domain;

a first measurement unit configured to measure first power of the electrical signal of the first frequency domain;

a second measurement unit configured to measure second power of the electrical signal of the second frequency domain; and a wavelength controller configured to control the wavelength of each of the plurality of light sources to maintain the certain wavelength interval based on at least one of the measured first power and second power.

7. The apparatus of claim 4, further comprising:

a plurality of first optical couplers configured to transmit (taps) the at least some of the output light of each of the plurality of light sources; and a second optical coupler configured to combine the at least some of the output light transmitted from the plurality of first optical couplers and transmit the combined light to the light reception unit.

8. A method of maintaining a wavelength interval of light sources, comprising:

receiving an electrical signal corresponding to an optical signal in which at least some of output light of each of the plurality of light sources having different wavelengths and having a certain wavelength interval is combined;

detecting a frequency component corresponding to the certain wavelength interval from the received electrical signal; and controlling the wavelength of each of the plurality of light sources so that the certain wavelength interval is maintained based on the detected frequency component, wherein the certain wavelength interval between adjacent light is identical between the plurality of light that the light sources output, wherein the receiving of the electrical signal includes:

modulating the optical signal in which the at least some of the output light of each of the plurality of light sources is combined to a sine wave of a preset first frequency; and receiving an electrical signal corresponding to the optical signal modulated to the sine wave of the first frequency, wherein:

the electrical signal corresponding to the optical signal modulated to the sine wave of the first frequency includes a first frequency domain and a second frequency domain including the frequency component corresponding to the certain wavelength interval; and in the controlling, the wavelength of each of the plurality of light sources is controlled to maintain the certain wavelength interval based on the frequency component detected from at least one frequency domain of the first frequency domain and the second frequency domain, wherein in the controlling, wavelength control of each of the plurality of light sources based on power of the first frequency domain and wavelength control of each of the plurality of light sources based on power of the second frequency domain are alternately performed.

9. The method of claim 8, wherein:

in the detecting, the electrical signal is band-pass filtered to detect a frequency domain including the frequency component corresponding to the certain wavelength interval; and the controlling includes measuring power of the band-pass filtered electrical signal and controlling the wavelength of each of the plurality of light sources based on the measured power.

10. The method of claim 9, wherein, in the controlling, the wavelength of each of the plurality of light sources is controlled so that the measured power is maximized.

11. The method of claim 8, wherein in the controlling, the wavelength of each of the plurality of light sources is controlled to maintain the certain wavelength interval based on both power of the first frequency domain and power of the second frequency domain.

12. The method of claim 8, wherein:

in the detecting, each of the first frequency domain and the second frequency domain of the electrical signal is band-pass filtered; and the controlling includes measuring first power of the electrical signal of the first frequency domain, measuring second power of the electrical signal of the second frequency domain, and controlling the wavelength of each of the plurality of light sources to maintain the certain wavelength interval based on at least one of the measured first power and second power.

* * * * *